Jan. 2, 1923.

A. SUNDH.
FLEXIBLE COUPLING.
FILED APR. 13, 1921.

Inventor
August Sundh
By his Attorneys
Kenyon & Kenyon

Jan. 2, 1923. 1,440,847.
A. SUNDH.
FLEXIBLE COUPLING.
FILED APR. 13, 1921. 2 SHEETS—SHEET 2.
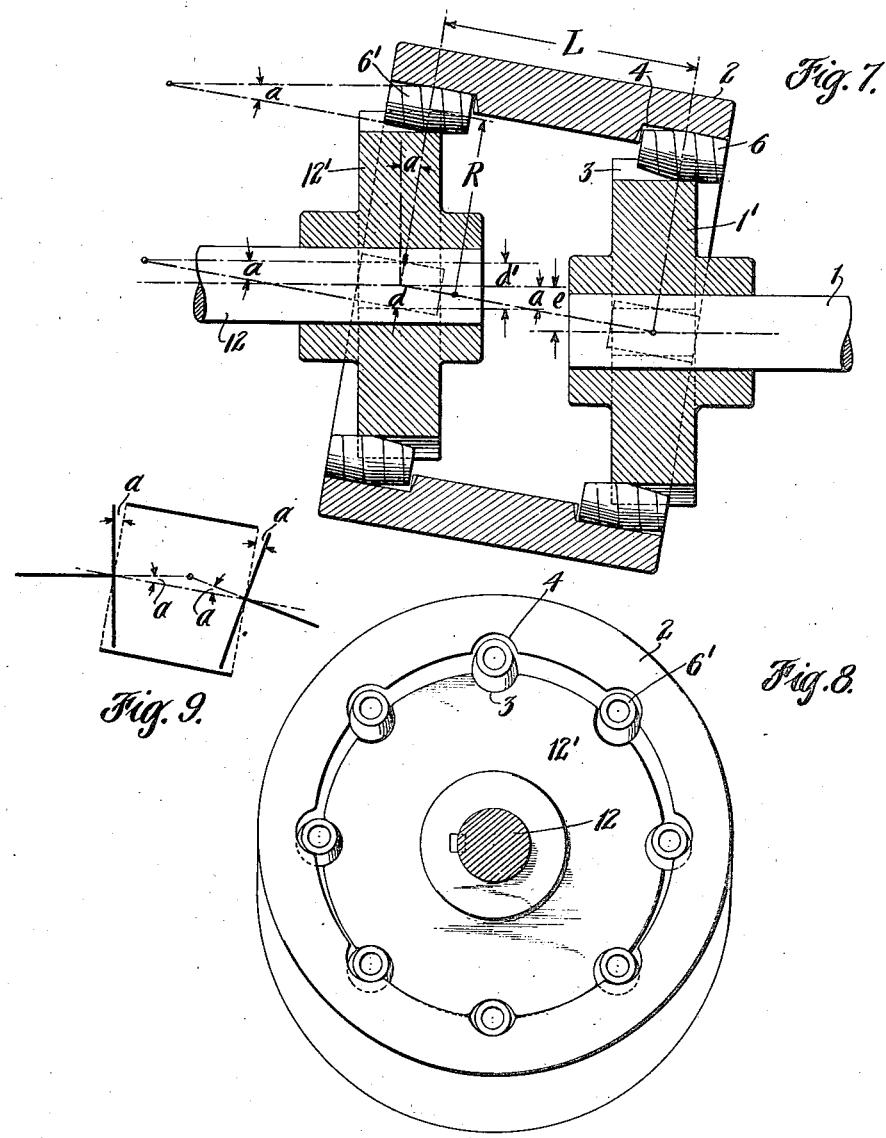
Inventor
August Sundh
By his Attorneys
Kenyon & Kenyon Patented Jan. 2, 1923.

1,440,847

UNITED STATES PATENT OFFICE.

AUGUST SUNDH, OF YONKERS, NEW YORK.

FLEXIBLE COUPLING.

Application filed April 13, 1921. Serial No. 461,027.

*To all whom it may concern:*

Be it known that I, AUGUST SUNDH, a citizen of the United States, and a resident of Yonkers, county of Westchester, and State of New York, have invented certain new and useful Improvements in Flexible Couplings, of which the following is a specification.

My invention relates to machine elements and particularly to devices for transmitting power between misalined power transmitting members.

An object of my invention is to provide means for transmitting power from one member to another which will permit the members to be out of alinement either angularly or by being positioned with their axes parallel though not in alinement.

Another object of my invention is to provide a flexible coupling means together with auxiliary power transmitting means, the auxiliary means being normally maintained in inoperative condition by the coupling means.

Another object of my invention is to provide means for transmitting power between the misalined members whereby non-uniformity of transmision is avoided; a further object being to avoid binding in the transmitting members by reason of misalinement.

Other and further objects of my invention will appear from the following description taken in connection with the accompanying drawings forming a part of this specification and will be pointed out in the hereunto appended claims.

In the drawings in which like reference characters indicate similar parts,

Fig. 7 is a sectional view diagrammatic in certain respects of a construction similar to that shown in Fig. 1.

Fig. 8 is an end view of the construction shown in Fig. 7.

Fig. 9 is a diagram of an alternative arrangement of parts shown in Figs. 1 and 7.

Figure 1:
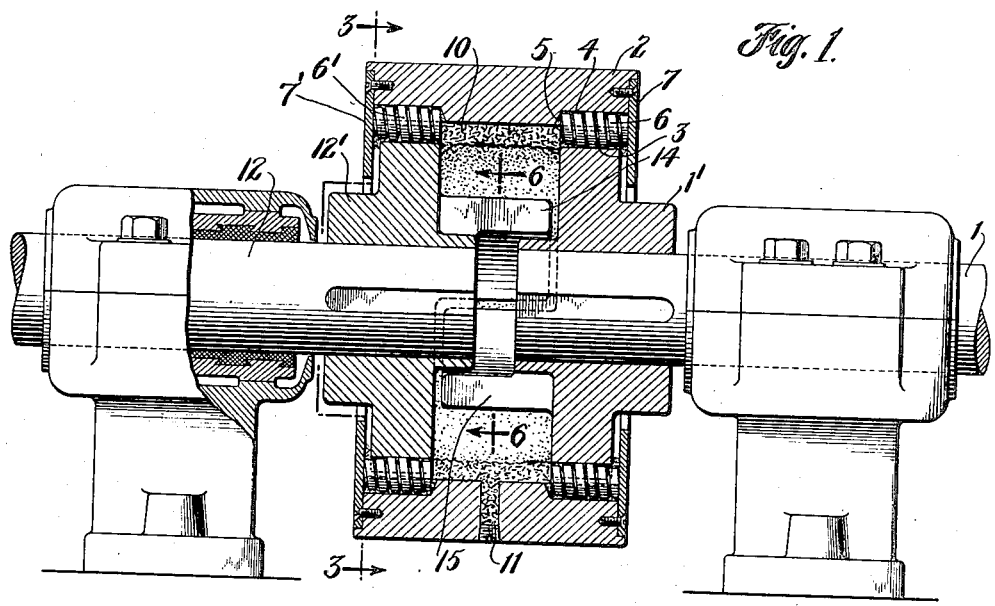
Fig. 1 is a vertical elevation partly in section and with parts broken away of a power transmitting device embodying my invention.
Figure 3:
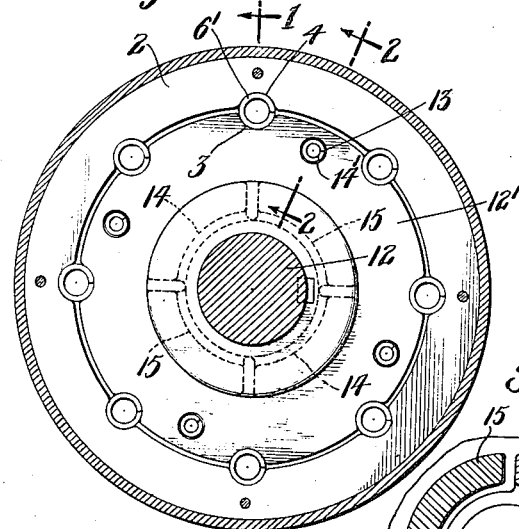
Fig. 3 is a sectional view on the line 3—3 of Fig. 1.
Figure 2:
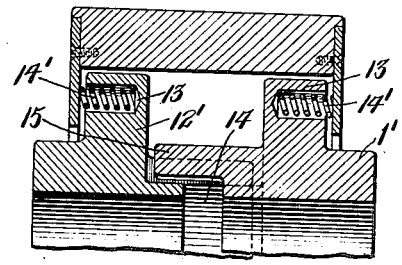
Fig. 2 is a partial sectional view on the line 2—2 of Fig. 3.
Figures 4, 6:
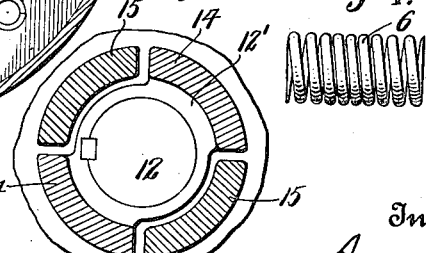
Fig. 4 shows a detail of one of the elements of the construction shown in Fig. 1.
Fig. 6 is a partial sectional view upon the lines 6—6 of Fig. 1.
Figure 5:
Fig. 5 is a detailed view of an alternative form of the element shown in Fig. 4.

My invention involves a source of power mounted for rotation, which may be the driving member 1 consisting of a shaft to which is firmly secured a member 1' which, in the embodiment shown, is disk-like, and a power receiving and transmitting member which, in the embodiment shown, comprises a cylindrical member 2. In the driving member 1' there are formed recesses 3 which are preferably in the periphery of the member 1' as shown; and, in the power receiving and transmitting member 2 there are formed similar recesses 4 which are preferably, as shown, in the inner surface thereof. The recesses 4 preferably extend part way in from the end of the member 2 so that a shoulder 5 is formed. The recesses 3 and 4 are respectively opposed and form spaces between the two members 1' and 2 in which are positioned engaging parts 6. In order to compensate for the misalinement of the driving member 1' and the power receiving and transmitting member 2, it is preferable that the engagement of the members 6 therewith shall be less effective toward the ends of said engaging members as will appear from the description hereafter of the arrangement shown in Fig. 7. This may be accomplished in numerous ways, examples of which are given, but it is not intended that my invention shall be limited to the particular examples described. For instance, the members 6 which are helically formed resilient members and which are positioned in the spaces under tension, may be tapered preferably from the center toward each end as shown in Figs. 1 and 7; or, the convolutions may be more widely separated preferably toward both ends as shown in Fig. 4 (such a construction might also be tapered); or, as shown in Fig. 5, the cross-sectional area of the helically formed member may be decreased preferably from the center toward both ends. The coacting surfaces of each engaging part 6 and the recesses 3 and 4 in which it is located are normally tapering with respect to each other, the said recesses as shown being substantially semicylindrical. In any of these instances the effectiveness of the engaging members 6 varies throughout its length and preferably from the center toward both ends; and, inasmuch as the engaging members 6 are positioned in the spaces under compression the degree of compression will decrease along the length of the member preferably from the center toward both ends. The members 6 engage the shoulders 5 at their inner ends and a retaining ring 7 secured to one of the two main members, preferably the power receiving and transmitting member 2, engages the outer ends of the engaging members 6. This ring also extends radially inward alongside of the member 1' so that lubricating material on the engaging member 6 which is thrown out by the centrifugal force will be conserved.

Power might be taken directly from the power receiving and transmitting member 2 or it might be transmitted to a driven member 12 by a member 12' attached thereto, similar to the member 1', by means of engaging members 6' positioned in spaces formed by recesses similar to the recesses 3 and 4. In such a case, the construction constitutes a coupling member between shafts which may be misalined angularly or merely have their axes out of alinement but parallel. A retaining ring 7' similar to the retaining ring 7 holds the engaging members 6' in position and the two rings form with the power transmitting and receiving member 2 a casing for lubricating material 10, which may be readily introduced by removal of the plug 11 and which will be held in proper relation to the engaging members 6 and 6' by centrifugal force. The members 1' and 12' are provided with recesses 13 in which are positioned springs 14 which bear against the rings 7 and 7' to hold them in place.

In case the flexible coupling means described, breaks down I have found that it is highly desirable to have an auxiliary means for transmitting power between the shafts 1 and 12 and to this end, I provide the disk 12' with axially extending lugs 14 and the disk 1' with similar lugs 15, the lugs 14 and 15 being in circumferential alinement but held out of operative condition, that is, out of contact, by the first described power transmitting means. It will be apparent that if the first described flexible transmitting means breaks down by reason of the failure of the engaging members 6 and 6', for example, the lugs 14 and 15 will come into contact and will transmit power but there will be a loss of uniformity of motion and of quietness of operation.

In order to more fully disclose the principles of operation of a machine element embodying my invention, I have shown in Fig. 7 the conditions existing during the exaggerated misalinement of shafts in which the angle of taper of the engaging members 6 and 6' is indicated by the letter $a$. The distance between centers of the engaging members is indicated by the letter L. The radial distance between the axis of the tower receiving and transmitting member 2 and the axes of the engaging member 6 is indicated by the letter R. The maximum diameter of an engaging member is $d$ and the diameter of one of the spaces formed by the recesses 3 and 4 is $d'$. From this diagram it will be apparent that the maximum distance between the parallel axes of the shafts 1 and 12 is that in which the power transmitting member 2 is tipped over until the angle between a perpendicular to the axis of one of the shafts and the radius of the member 2 is $a$, as, under such conditions, the conical surfaces of the engaging members 6 and 6' which are tapered at the angle $a$ will be in line contact with the inner surfaces of both the recesses 3 and 4. Similarly, line contact will occur between the conical surface of the engaging member 6 and the faces of the recesses 3 and 4 when the angular misalinement between the shafts 1 and 12 is equal to the angle $a$ as shown in Fig. 9. The maximum angularity between the member 2 and one of the shafts being $a$ the maximum eccentricty $1_{max}$ is equal to L sin $a$. Under these conditions, if the maximum diameter of the spaces formed by the recesses 3 and 4 is $d'$ the maximum diameter of the member 6 will be $\frac{d'}{\cos a}$. Or, in case of resilient engaging members, if $d$ equals $d'$, the member 6 will have to yield an amount equal to $d\left(\frac{1}{\cos a} - 1\right)$. There will be an axial sliding of the members 6 during each revolution, an amount equal to 2R sin $a$ where $a$ is the actual angle between the member 2 and one of the shafts.

It will now be apparent that my invention involves a power transmitting member which may be operated without production of noise and excessive friction when the members between which power is transmitted are out of alinement and that if the engaging members are tapered the angularity between a shaft and the power receiving and transmitting member 2 may be equal to the angle of taper; or, if the engaging members 6 are resilient and of less strength toward their ends, they will be susceptible to compression to compensate for this angularity. It will also be apparent that where the engaging members are inserted under compression a decreasing of compression toward the ends thereof may be effected either by taper or by lessening their resilient effect toward the ends, both methods of securing this effect being implied in the term "tapering" which term might also be applied to a solid member. It will further be apparent that in case the quietly operating means for transmitting power uniformly breaks down, an auxiliary transmitting means will come into operation.

While I have described certain details of the construction in order to disclose my invention, it is not intended that my invention shall be limited thereto but that it shall be defined by the hereunto appended claims.

What I claim as new and desire to secure by Letters Patent is:

1. In a flexible coupling device a driving member and a driven member each provided with recesses, a power receiving and transmitting member radially spaced from said driving and driven members to form annular spaces with each of them and having recesses opposed to and forming spaces with said recesses of said driving and driven members, and parts positioned in said spaces formed by said opposed recesses, the opposed surfaces of said spaces and said parts therein diverging from substantially the center of said parts toward the ends thereof to permit misalinement of said driving and driven members during transmission of power.

2. In a flexible coupling device members positioned one about the other and provided with recesses, one of said members being a driving member and the other a driven member and the recesses of one being opposed to and forming spaces with the recesses of the other, and parts in said spaces formed by said opposed recesses, said members being radially spaced and the co-acting surfaces of said spaces formed by said recesses and of the parts therein diverging to permit misalinement of said members during the driving of one by the other through said parts.

3. In a flexible coupling device members positioned one about the other and provided with recesses, one of said members being a driving member and the other a driven member and the recesses of one being opposed to and forming spaces with the recesses of the other, and parts in said spaces formed by said opposed recesses, said members being radially spaced and the opposed surfaces of said spaces and the parts therein diverging from substantially the center of said parts toward the ends thereof to permit misalinement of said members during the driving of one by the other through said parts.

4. In a flexible coupling device driving and driven members each provided with recesses extending parallel with their respective axes, means for supporting one of said members for rotation, a power receiving and transmitting member having portions radially spaced from and in radial alinement with said driving and driven members and provided with recesses extending parallel with its axis and opposed to and forming spaces with said recesses of said driving and driven members, and coil springs positioned in and extending longitudinally of said spaces, said springs constituting a support for said transmitting member and resiliently holding it in spaced relation to said driving and driven members to permit transmission of forces between said driving and driven members when said members are misalined.

5. In a flexible coupling device a driving member and a driven member each provided with recesses, a power receiving and transmitting member radially spaced from said driving and driven members to form annular spaces with each of them and having recesses opposed to and forming spaces with said recesses of said driving and driven members and parts positioned in said spaces formed by said recesses and constituting a support for said power receiving and transmitting member and said parts holding said transmission member in spaced relation to said driving and driven members and being tapered from substantially their centers toward their ends to permit transmission of forces from said driving member to said driven member when said members are misalined.

6. In a flexible coupling device members positioned one about the other and provided with recesses, one of said members being a driving member and the other a driven member and the recesses of one being opposed to and forming spaces with the recesses of the other, and parts in said spaces formed by said opposed recesses, said members being radially spaced and said parts holding said members in spaced relation and being tapered from substantially their centers toward their ends to permit transmission of forces when said members are misalined.

7. In a flexible coupling device a member having recesses therein, means for supporting said member for rotation, a second member in radial alinement with said first named member and provided with recesses opposed to and forming spaces with said first named recesses, and parts positioned in said spaces for transmitting forces between said members, said members being radially spaced and said parts being tapered to permit misalinement of said members.

8. In a flexible coupling device a member having recesses therein, means for supporting said member for rotation, a second member in radial alinement with said first named member and provided with recesses opposed to and forming spaces with said first named recesses, and springs positioned in said spaces for transmitting forces between said members, said members being spaced and the surfaces of said springs being tapered to permit misalinement of said members.

9. In a flexible coupling device a driving member supported for rotation and provided with recesses extending substantially parallel to its axis, a power receiving and transmitting member provided with recesses extending substantially parallel to its axis, said members encircling one another and the recesses of one being opposed to and forming spaces with the recesses of the other, a driven part, means for transmitting forces from said transmitting member to said driven part, and coil springs extending longitudinally of said spaces and supporting said transmitting member, said members being radially spaced and said springs resiliently holding said members in spaced relation to permit transmission of forces between said members when said members are misalined.

10. In a flexible coupling device, a driving member provided with recesses, a bearing supporting said driving member, a driven member provided with recesses, a bearing supporting said driven member, a power receiving and transmitting member provided with recesses respectively opposed to said recesses of said driving and driven members, said driving and transmitting members encircling one another in radially spaced relation and said driven and transmitting members encircling one another in radially spaced relation, and parts engaging in respectively opposed recesses and supporting said transmitting member from and in spaced relation to said driving and driven members, said parts being tapered to permit misalinement of said members.

11. In a flexible coupling device, a driving member having recesses extending parallel with its axis, a bearing supporting said member for rotation, a second member having recesses extending parallel with its axis and opposed to and forming spaces with said first named recesses, said members encircling one another, coil springs positioned longitudinally in said spaces under radial compression and supporting said second member from said driving member, said members being spaced from one another, and the degree of compression of said springs decreasing from substantially their centres toward their ends to permit transmission of force from one member to the other through said springs when said members are misalined.

12. In combination, a rotatable driving member, a power receiving member, one of said members having recesses, and parts in said recesses engaging both of said members, the coacting surfaces of said parts and one of said members normally tapering with respect to each other.

13. In combination, a rotatable driving member, a power receiving member, one of said members having recesses, and parts in said recesses engaging both of said members and unattached thereto, the coacting surfaces of said parts and one of said members normally tapering with respect to each other.

14. In combination, a driving member and a driven member mounted for rotation, a power receiving and transmitting member surrounding said driving and driven members and having portions respectively in radial alinement with portions of said first named members, said first named members having recesses, and said power receiving and transmitting member having recesses respectively opposed to said recesses of said driving and driven members, and parts engaging respectively opposed recesses.

15. In combination, members mounted for rotation, a power receiving and transmitting member having portions respectively in radial alinement with portions of said first named members, said first named members having recesses formed therein and said receiving member having recesses respectively opposed to and forming spaces with said first named recesses, parts positioned in said spaces and retainers mounted on said power receiving and transmitting member engaging said parts and extending alongside of said first named members to form a lubricant casing 16. In combination, members mounted for rotation, one being a driven member and the other a driving member therefor, a power receiving and transmitting member, said first named members having recesses formed therein and said receiving member having recessed respectively opposed to and forming spaces with said first named recesses, engaging parts positioned in said spaces, and auxiliary means for transmitting rotation from said driving to said driven member held normally in inoperative position by said engaging parts.

17. In combination, members mounted for rotation, means including a part disconnected from and substantially surrounding said members for transmitting rotation from one to the other and auxiliary means for transmitting rotation from one member to the other and normally held in inoperative condition by said first named means.

18. In combination, members mounted for rotation about independent axes, and having peripheral recesses in substantial parallelism with the axes of the respective members in which they are formed, a power receiving and transmitting member encircling said first named members and having portions respectively in radial alinement with said first named members and having recesses extending part way inwardly from the edges thereof whereby a shoulder is formed at the inner ends of said recesses, parts tapered toward both ends and positioned in the recesses of said last named member, certain of said parts also being positioned in the recesses of one of said first named members and certain other of said parts being also positioned in the recesses of the other of said first named member, and retaining rings secured to the edges of said power receiving and transmitting member engaging the ends of said parts.

19. The combination as defined in claim 18 in which the retaining rings extend alongside of said first named members to form with said power receiving and transmitting member a lubricant container.

20. In combination, members mounted for rotation, a power receiving and transmitting member, said first named members having recesses formed therein, and said receiving member having recesses respectively opposed to and forming spaces with said first named recesses, engaging parts positioned in said spaces, and retainers attached to said power receiving and transmitting member, engaging said parts and extending alongside said first mentioned members and forming a lubricant container.

21. In combination, members mounted for rotation and having recesses formed therein, one being a driven member and the other a driving member therefor, a power receiving and transmitting member including portions radially spaced from portions of said first named members and having recesses formed therein and opposed to the recesses of said first named members, and parts engaging in the recesses of said power receiving and transmitting member, certain of said parts engaging in recesses of one of said first named members and certain other of said parts engaging in recesses of the other of said first named members.

22. In combination, members mounted for rotation, and having recesses formed therein, one being a driven member and the other a driving member therefor, a power receiving and transmitting member having recesses formed therein and opposed to the recesses of said first named members, and parts engaging in the recesses of said power receiving and transmitting member, certain of said parts engaging in recesses of one of said first named members and certain other of said parts engaging in recesses of the other of said first named members and said parts being tapered to permit misalinement of said first named members.

23. In combination, two shafts mounted for rotation, a member secured to each shaft and having recesses formed therein, a power receiving and transmitting member having portions in radial alinement with and radially spaced from portions of said members on said shafts and provided with recesses opposed to said recesses of said members on said shafts, and parts engaging in respectively opposed recesses and limiting relative rotation between and permitting misalinement of said members on said shafts and said power receiving and transmitting members.

24. In combination, two shafts mounted for rotation, a member secured to each shaft and having recesses formed therein, a power receiving and transmitting member having portions in radial alinement with and radially spaced from portions of said members on said shafts and provided with recesses opposed to said recesses of said members on said shafts, springs engaging in respectively opposed recesses and yieldingly permitting misalinement of and transmitting forces between said members on said shafts and said power receiving and transmitting member.

In testimony whereof, I have signed my name to this specification.

AUGUST SUNDH.